(12) United States Patent
Kang et al.

(10) Patent No.: US 10,237,539 B2
(45) Date of Patent: Mar. 19, 2019

(54) 3D DISPLAY APPARATUS AND CONTROL METHOD THEREOF

(71) Applicant: SAMSUNG ELECTRONICS CO., LTD., Suwon-si (KR)

(72) Inventors: Jin-mo Kang, Suwon-si (KR); Sung-yeol Kim, Suwon-si (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 15/078,512

(22) Filed: Mar. 23, 2016

(65) Prior Publication Data

US 2017/0111633 A1 Apr. 20, 2017

(30) Foreign Application Priority Data

Oct. 16, 2015 (KR) .......................... 10-2015-0144698

(51) Int. Cl.
*H04N 13/04* (2006.01)
*H04N 13/31* (2018.01)
(Continued)

(52) U.S. Cl.
CPC .......... *H04N 13/305* (2018.05); *H04N 13/31* (2018.05); *H04N 13/317* (2018.05); *H04N 13/351* (2018.05); *H04N 13/398* (2018.05)

(58) Field of Classification Search
CPC .......... H04N 13/0404; H04N 13/0409; H04N 13/0415; H04N 13/0447; H04N 13/0497
(Continued)

(56) References Cited

U.S. PATENT DOCUMENTS

| 8,766,890 | B2 * | 7/2014 | Robinson | G02B 27/2264 345/102 |
| 2010/0134493 | A1 * | 6/2010 | Kwak | G09G 3/003 345/426 |

(Continued)

FOREIGN PATENT DOCUMENTS

| EP | 2854402 A1 | 4/2015 |
| JP | 2013-529309 A | 7/2013 |

(Continued)

OTHER PUBLICATIONS

International Search Report dated Jan. 31, 2017 issued by International Searching Authority in counterpart International Patent Application No. PCT/KR2016/011483 (PCT/ISA/210).

(Continued)

*Primary Examiner* — Deirdre L Beasley
(74) *Attorney, Agent, or Firm* — Sughrue Mion, PLLC

(57) ABSTRACT

A 3D display apparatus is provided. The 3D display apparatus includes a display panel and a viewing area separator disposed on a front side of the display panel and configured to provide a plurality of optical views having different viewpoints to a viewing zone, and a processor configured to render a plurality of image views having different viewpoints based on a depth of an input image and provide a multiview image by arranging the plurality of image views on the display panel in an arrangement pattern. The processor is further configured to determine, based on the arrangement pattern, an estimated crosstalk occurring between the plurality of image views having the different viewpoints, correct the plurality of image views by performing crosstalk inverse compensation according to the estimated crosstalk, and provide the multiview image based on the crosstalk inverse compensation.

17 Claims, 26 Drawing Sheets

(51) Int. Cl.
  *H04N 13/305* (2018.01)
  *H04N 13/317* (2018.01)
  *H04N 13/351* (2018.01)
  *H04N 13/398* (2018.01)

(58) Field of Classification Search
  USPC .......................................................... 348/59
  See application file for complete search history.

(56) References Cited

U.S. PATENT DOCUMENTS

| | | | | |
|---|---|---|---|---|
| 2013/0293576 | A1* | 11/2013 | Zomet | H04N 13/0007 345/629 |
| 2014/0085432 | A1* | 3/2014 | Wu | G09G 3/006 348/51 |
| 2015/0015681 | A1* | 1/2015 | Kim | G02B 27/2214 348/51 |
| 2015/0029317 | A1* | 1/2015 | Kim | G02B 27/2214 348/59 |
| 2015/0042770 | A1* | 2/2015 | Barenbrug | H04N 13/0447 13/447 |
| 2015/0130914 | A1* | 5/2015 | Hyodo | H04N 13/0447 13/447 |
| 2015/0245007 | A1* | 8/2015 | Hyodo | H04N 13/0022 13/22 |

FOREIGN PATENT DOCUMENTS

| | | |
|---|---|---|
| JP | 2015-039070 A | 2/2015 |
| KR | 10-2010-0063300 A | 6/2010 |
| KR | 10-2011-0024062 A | 3/2011 |
| KR | 10-2013-0017890 A | 2/2013 |
| KR | 10-2013-0025761 A | 3/2013 |
| KR | 10-2014-0130904 A | 11/2014 |

OTHER PUBLICATIONS

Written Opinion dated Jan. 31, 2017 issued by International Searching Authority in counterpart International Patent Application No. PCT/KR2016/011483 (PCT/ISA/237).

Communication dated Jul. 13, 2018, issued by the European Patent Office in counterpart European Application No. 16855734.6.

* cited by examiner

OPTICAL VIEW 7 VIEWPOINTS
RENDERING IMAGE VIEW 35 VIEWPOINTS

FIG. 4B

|       | View1 | View2 | View3 | View4 |
|-------|-------|-------|-------|-------|
| View1 | 1     | a%    | b%    | a%    |
| View2 | a%    | 1     | a%    | b%    |
| View3 | b%    | a%    | 1     | a%    |
| View4 | a%    | b%    | a%    | 1     |

$[X]_{crosstalk\ martix}$

OPTICAL VIEW (M) OPTICAL PROFILE

OPTICAL VIEW (M) X-TALK MODELING

FIG. 9A

| V(n-2) | V(n-1) | V(n) | V(n+1) | V(n+2) |
|--------|--------|------|--------|--------|
| b % | a % | 100 % | a % | b % |

FIG. 9B

|        | V(n-2) | V(n-1) | V(n)  | V(n+1) | V(n+2) |
|--------|--------|--------|-------|--------|--------|
| V(n-2) | 100 %  | a %    | b %   | c %    | d %    |
| V(n-1) | a %    | 100 %  | a %   | b %    | c %    |
| V(n)   | b %    | a %    | 100 % | a %    | b %    |
| V(n+1) | c %    | b %    | a %   | 100 %  | a %    |
| V(n+2) | d %    | c %    | b %   | a %    | 100 %  |

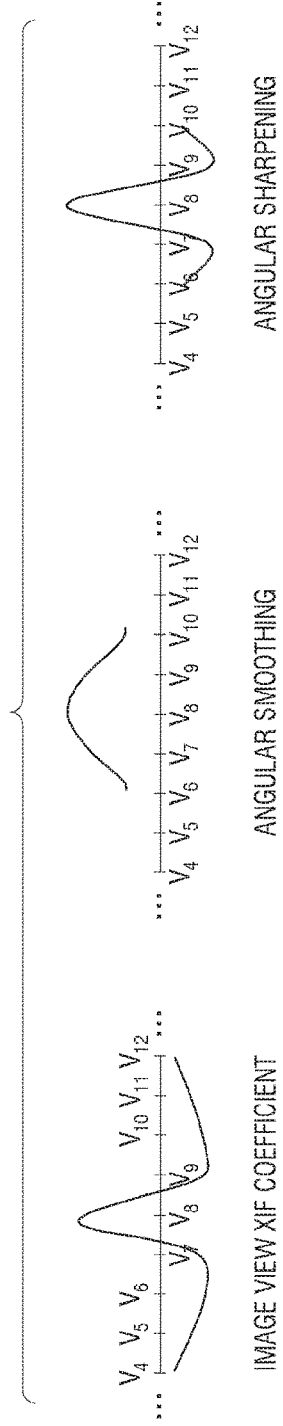

3D DISPLAY APPARATUS AND CONTROL METHOD THEREOF

CROSS-REFERENCE TO RELATED APPLICATION

This application claims priority from Korean Patent Application No. 10-2015-0144698, filed on Oct. 16, 2015 in the Korean Intellectual Property Office, the disclosure of which is incorporated herein by reference in its entirety.

BACKGROUND

Field

Apparatuses and methods consistent with exemplary embodiments relate to an autostereoscopic three-dimensional (3D) display apparatus and a control method thereof, and more particularly, to a 3D display apparatus which provides a 3D image by rendering more image views than optical views, and a control method thereof.

Description of Related Art

With the development of electronic technology, various types of electronic apparatuses have been developed and become widespread. In particular, display apparatuses, such as televisions (TVs), which are one of the most commonly used home appliances, have been rapidly developed in recent years.

With improved performance of display apparatuses, the type of content available to be displayed has increased. In particular, stereoscopic display systems capable of displaying three-dimensional (3D) content have recently been developed and become widespread.

The stereoscopic display apparatuses may be implemented within various types of display apparatuses, such as a monitor, a portable phone, a personal digital assistant (PDA), a personal computer (PC), a set-top PC, a tablet PC, an electronic photo frame, a kiosk, or a 3D TV. The 3D display technology may be used in homes, as well as in various fields necessary for 3D imaging such as science, medicine, design, education, advertising, or computer gaming.

The stereoscopic display systems may be categorized as autostereoscopic systems that allow a user to view 3D images without glasses and stereoscopic systems that require a user to wear glasses to view 3D images.

The stereoscopic system may provide a satisfactory 3D effect, but inconvenience the viewer by requiring glasses. In comparison, the autostereoscopic system does not require a user to wear glasses to view 3D images, and thus there has been steady development of autostereoscopic systems.

Image quality of a 3D image may be affected by contrast, flicker, crosstalk, or the like in the autostereoscopic system. Crosstalk is a phenomenon where left-eye and right-eye images are mixed. For example, a left-eye image may be mixed with a right-eye image and viewed through the right eye, or the right-eye image may be mixed with the left-eye image and viewed through the left eye. The sharpness of the 3D image may be degraded due to the crosstalk.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a three-dimensional (3D) display apparatus including: a display including a display panel and a viewing area separator disposed on a front side of the display panel and configured to provide a plurality of optical views having different viewpoints to a viewing zone; and a processor configured to render a plurality of image views having different viewpoints based on a depth of an input image and provide a multiview image by arranging the plurality of image views on the display panel in an arrangement pattern. The processor is further configured to determine, based on the arrangement pattern, an estimated crosstalk occurring between the plurality of image views having the different viewpoints, correct the plurality of image views by performing crosstalk inverse compensation according to the estimated crosstalk, and provide the multiview image based on the crosstalk inverse compensation.

A number of the plurality of image views may be greater than a number of the plurality of optical views, and each of the plurality of optical views may be provided based on at least two image views of the plurality of image views having different viewpoints.

The processor may be further configured to determine the estimated crosstalk based on a difference between an output pixel region of the display panel and a corresponding visible pixel region provided through the image views.

A plurality of visible pixel regions may be tilted at a preset angle corresponding to the plurality of optical views, the plurality of visible pixel regions being separated by the viewing area separator, and the processor may be further configured to perform theoretical crosstalk modeling on a reference image view based on the preset angle, the number of image views, and a rendering pitch.

The processor may be further configured to perform the theoretical crosstalk modeling on the reference image view based on the preset angle, the number of image views, the rendering pitch, and reflecting a Gaussian optical profile to the modeled theoretical crosstalk.

The processor may be further configured to calculate a crosstalk occurrence weight for at least one image view of the plurality of image views which provides the crosstalk to the reference image view based on the preset angle, the number of image views, and the rendering pitch, and perform the crosstalk inverse compensation by generating a crosstalk matrix according to the calculated crosstalk occurrence weight.

The processor may be further configured to generate an epipolar image by combining a plurality of pixel lines of the plurality of rendered image views, and perform the crosstalk inverse compensation by applying a crosstalk inverse filter to the generated epipolar image, and the crosstalk inverse filter may generate an inverse matrix of the crosstalk matrix.

The processor may be further configured to adjust a filtering coefficient of the crosstalk inverse filter based on a characteristic of the input image and perform the crosstalk inverse compensation by reflecting the adjusted filtering coefficient.

The processor may be further configured to divide the crosstalk inverse filter into an angular smoothing filter and an angular sharpening filter, and adjust the filtering coefficient of the crosstalk inverse filter by adjusting coefficients of the angular smoothing filter and the angular sharpening filter based on the characteristic of the input image.

The processor may be further configured to acquire a plurality of target image views in which the plurality of rendered image views are corrected based on the epipolar image which is subject to the crosstalk inverse compensation, and arrange the plurality of image views on the display panel in the arrangement pattern based on the plurality of target image views to provide the multiview image.

According to an aspect of another exemplary embodiment, there is provided a method of controlling a three-dimensional (3D) display apparatus including a display panel and a viewing area separator disposed on a front side of the display panel and configured to provide a plurality of optical views having different viewpoints to a viewing zone, the method including: rendering a plurality of image views having different viewpoints based on a depth of an input image; and providing a multiview image by arranging the plurality of image views on the display panel in an arrangement pattern. The providing of the multiview image includes determining, based on the arrangement pattern, an estimated crosstalk occurring between the plurality of image views having the different viewpoints, correcting the plurality of view images by performing crosstalk inverse compensation according to the estimated crosstalk, and providing the multiview image based on the crosstalk inverse compensation.

A number of the plurality of image views may be greater than a number of the plurality of optical views, and each of the plurality of optical views may be provided based on at least two image views of the plurality of image views having different viewpoints.

The providing of the multiview image may include determining the estimated crosstalk based on a difference between an output pixel region of the display panel and a corresponding visible pixel region provided to the user through the image views.

A plurality of visible pixel regions may be tilted at a preset angle corresponding to the plurality of optical views, the plurality of visible pixel regions being separated by the viewing area separator, and the providing of the multiview image may include performing theoretical crosstalk modeling on a reference image view based on the preset angle, the number of image views, and a rendering pitch.

The providing of the multiview image may include calculating a crosstalk occurrence weight for at least one image view of the plurality of image views which provides the crosstalk to the reference image view based on the preset angle, the number of image views, and the rendering pitch, and performing the crosstalk inverse compensation by generating a crosstalk matrix according to the calculated crosstalk occurrence weight.

The providing of the multiview image may include generating an epipolar image by combining a plurality of pixel lines of the plurality of rendered image views, and performing the crosstalk inverse compensation by applying a crosstalk inverse filter to the generated epipolar image, and the applying the crosstalk inverse filter may include inverting the crosstalk matrix.

The providing of the multiview image may include adjusting a filtering coefficient of the crosstalk inverse filter based on a characteristic of the input image and performing the crosstalk inverse compensation by reflecting the adjusted filtering coefficient.

The providing of the multiview image may include dividing the crosstalk inverse filter into an angular smoothing filter and an angular sharpening filter, and adjusting the filtering coefficient of the crosstalk inverse filter by adjusting coefficients of the angular smoothing filter and the angular sharpening filter based on the characteristic of the input image.

The providing of the multiview image may include acquiring a plurality of target image views in which the plurality of rendered image views are corrected based on the epipolar image which is subject to the crosstalk inverse compensation, and the providing the multiview image may include arranging the plurality of image views on the display panel in the arrangement pattern based on the plurality of target image views.

According to an aspect of still another exemplary embodiment, there is provided a non-transitory computer readable recording medium having embodied thereon a program, which when executed by a processor of a three-dimensional (3D) display apparatus including a display panel and a viewing area separator disposed on a front side of the display panel and configured to provide optical views having diffident viewpoints in a viewing zone of a user is stored, causes the 3D display apparatus to execute a method, the method including: rendering a plurality of image views having different viewpoints based on a depth of an input image; and providing the multiview image using the plurality of view images corrected by performing crosstalk inverse compensation according to an estimated crosstalk. The providing of the multiview image includes determining, based on an arrangement pattern of the plurality of image views, an estimated crosstalk occurring between the plurality of image views having the different viewpoints, correcting the plurality of view images by performing crosstalk inverse compensation according to the estimated crosstalk, and providing the multiview image based on the crosstalk inverse compensation.

According to an aspect of still another exemplary embodiment, there is provided a three-dimensional (3D) display apparatus including: a display panel including a plurality of subpixels; a viewing area separator disposed on a front side of the display panel and configured to selectively block light emitted from the display panel at an oblique angle; and a processor configured to determine a crosstalk matrix corresponding to the plurality of subpixels and the viewing area separator, and control the plurality of subpixels to generate an image based on the crosstalk matrix.

The crosstalk matrix may be determined based on a crosstalk occurrence weight corresponding to at least one image view of the plurality of image views.

The crosstalk occurrence weight may be determined based on a preset angle of the viewing area separator and a rendering pitch of the plurality of subpixels.

Additional aspects and advantages of the exemplary embodiments are set forth in the detailed description, and will be obvious from the detailed description, or may be learned by practicing the exemplary embodiments.

BRIEF DESCRIPTION OF THE DRAWINGS

The above and/or other aspects will be more apparent by describing certain exemplary embodiments with reference to the accompanying drawings, in which:

FIGS. 4A, 4B and 4C are diagrams explaining a method of performing crosstalk inverse compensation according to various exemplary embodiments;

FIGS. 7, 8, 9A, 9B and 10 are diagrams illustrating a theoretical crosstalk calculation method according to various exemplary embodiments;

FIGS. 11, 12A, 12B and 12C are diagrams illustrating a coefficient adjusting method of a crosstalk inverse filter according to various exemplary embodiments;

DETAILED DESCRIPTION OF EXEMPLARY EMBODIMENTS

Figure 1A:
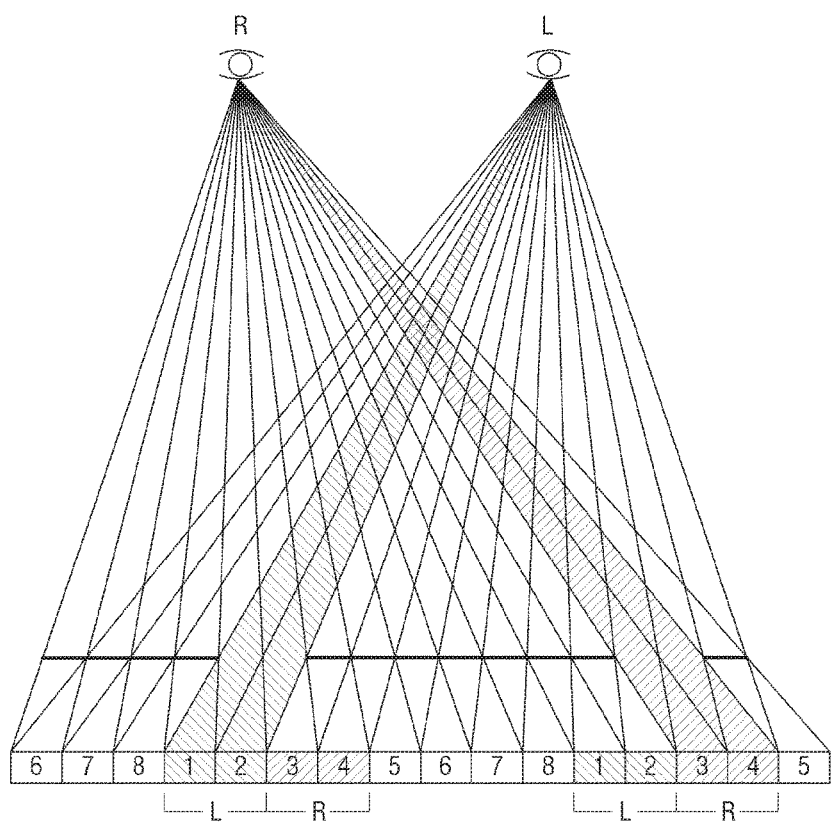
FIGS. 1A, 1B, 1C and 1D are diagrams illustrating operation of a 3D display apparatus according to various exemplary embodiments.

Hereinafter, exemplary embodiments are described in greater detail with reference to the accompanying drawings.

In the following description, unless otherwise described, the same reference numerals are used for the same elements, even when they are depicted in different drawings. The matters defined in the description, such as detailed construction and elements, are provided to assist in a comprehensive understanding of exemplary embodiments. Thus, it is understood that exemplary embodiments can be carried out without those specifically defined matters. Also, functions or elements known in the related art are not described in detail because they would obscure the exemplary embodiments with unnecessary detail.

It will be understood that the terms "includes", "including", "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

FIGS. 1A to 1D are diagrams illustrating an operation of a 3D display apparatus according to various exemplary embodiments.

FIG. 1A illustrates an operation method of a 3D display apparatus which displays a multiview image and provides a stereoscopic image through an autostereoscopic manner according to an exemplary embodiment. The multiview image includes a plurality of images in which the same object is imaged at different angles. That is, an image, in which the plurality of images imaged in different viewpoints are refracted to different angles, and thus focused at a position a certain distance from the display (for example, about 3 meters) called a viewing distance, may be provided. The position in which a viewing zone is formed may be called an optical view. One eye of a user may be positioned in a first viewing zone and the other eye of the user may be positioned in a second viewing zone. Thus, the user may experience a 3D effect.

Figure 1B:
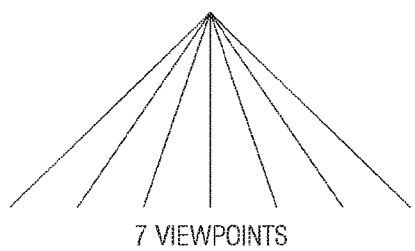

The 3D display apparatus according to an exemplary embodiment may provide one optical view using a plurality of image views. For example, the 3D display apparatus may generate the plurality of image views through rendering an input image, and may generate a multiview image such that at least two image views among the plurality of image views are provided as one optical view. FIG. 1A is a diagram illustrating a display operation, for example, in response to four optical views being provided using total eight image views having different eight viewpoints. Referring to FIG. 1A, in the autostereoscopic 3D display apparatus, among the eight viewpoints, light corresponding to images of first and second viewpoints may be projected to the left eye, and light corresponding to images of third and fourth viewpoints may be projected to the right eye. The user may view the images having different viewpoints through the left eye and the right eye, and thus the user may experience the 3D effect. However, this is merely exemplary, and in response to M optical views being provided using image views corresponding to total N viewpoints, where N is greater than M, one optical view may be configured of image views having N/M viewpoints. The 3D display apparatus may provide seven optical views using 35 image views as illustrated in FIG. 1C differently from an exemplary embodiment which provides seven optical views using seven image views as illustrated in FIG. 1B.

Figure 1C:
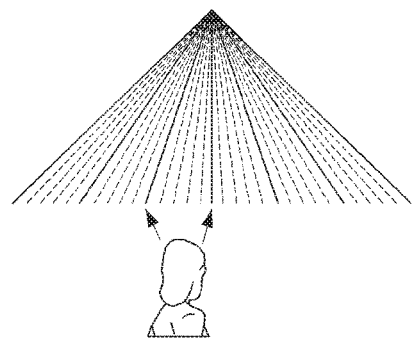
Figure 1D:
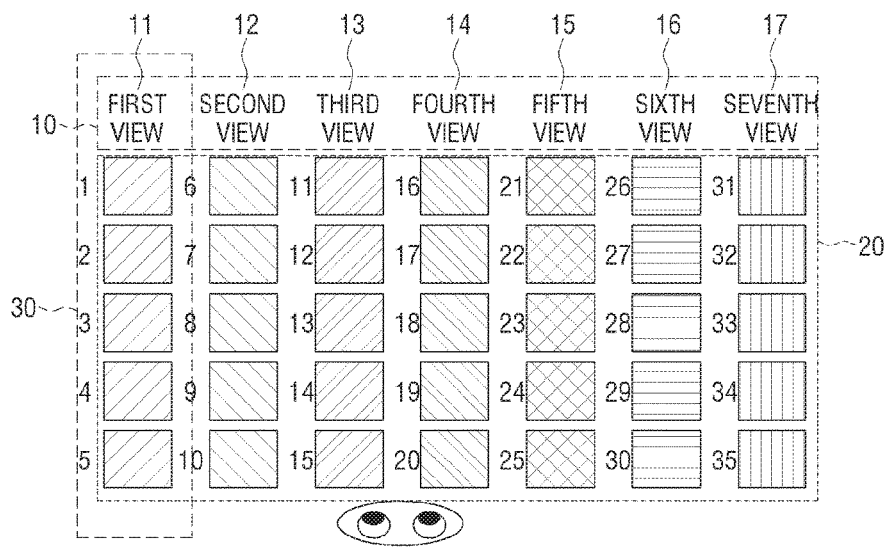

FIG. 1D illustrates the exemplary embodiment illustrated in FIG. 1C in greater detail. Referring to FIG. 1D, a total of seven optical views 11 to 17 may be provided, and each optical view may include five image views (sub views or virtual viewpoint images). That is, the seven optical views 11 to 17 may be provided using 35 total image views 20 (1 to 35). For example, a first optical view 11 may be provided using first to fifth image views. In this example, in response to a parallax between neighboring optical views being A, a parallax between neighboring image views may be A/5. A parallax between a left eye and a right eye may be A which is the parallax between the neighboring optical views. Accordingly, smooth viewing area conversion may differ from the exemplary embodiment of FIG. 1B in which the number of image views is equal to the number of optical views. However, according to another exemplary embodiment, the number of image views may be equal to the number of optical views in at least one viewing zone. That is, in response to the number of image views being A, the number of optical views provided in the at least one viewing zone may be A which corresponds to the number of image views.

Multiview images may be generated based on a linear mapping method or a cyclic mapping method as a view mapping method. FIG. 1A illustrates the linear mapping method. According to various exemplary embodiments, the multiview image may be generated based on the cyclic mapping method.

Figure 2A:
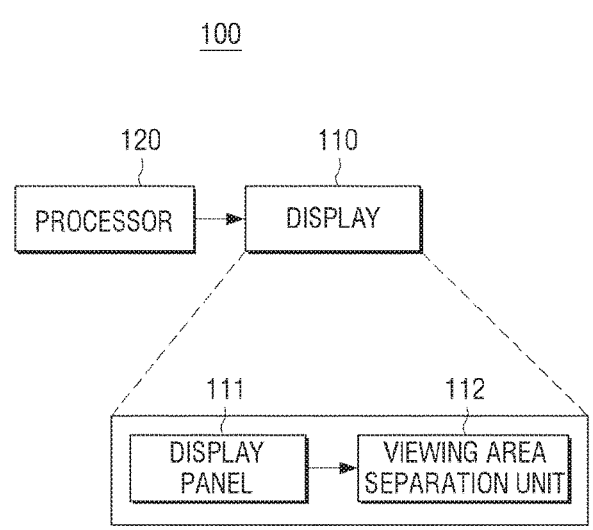
FIGS. 2A, 2B and 2C are diagrams illustrating configuration of a 3D display apparatus according to various exemplary embodiments.
Figure 2B:
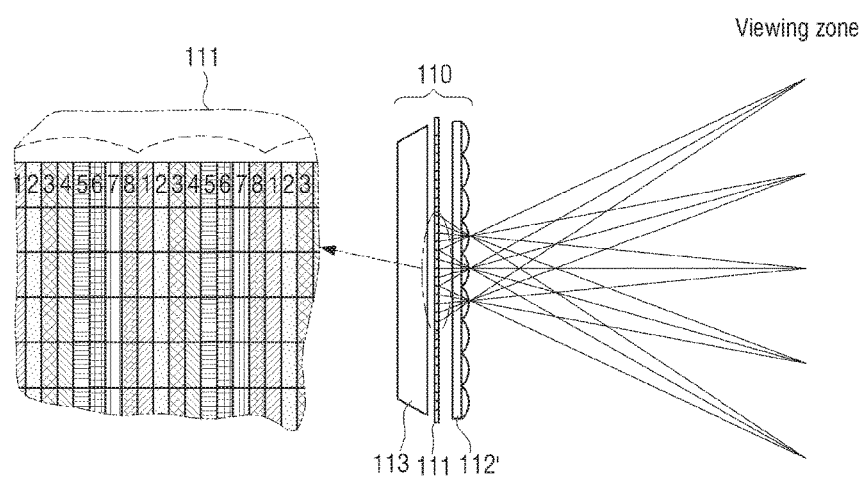
Figure 2C:
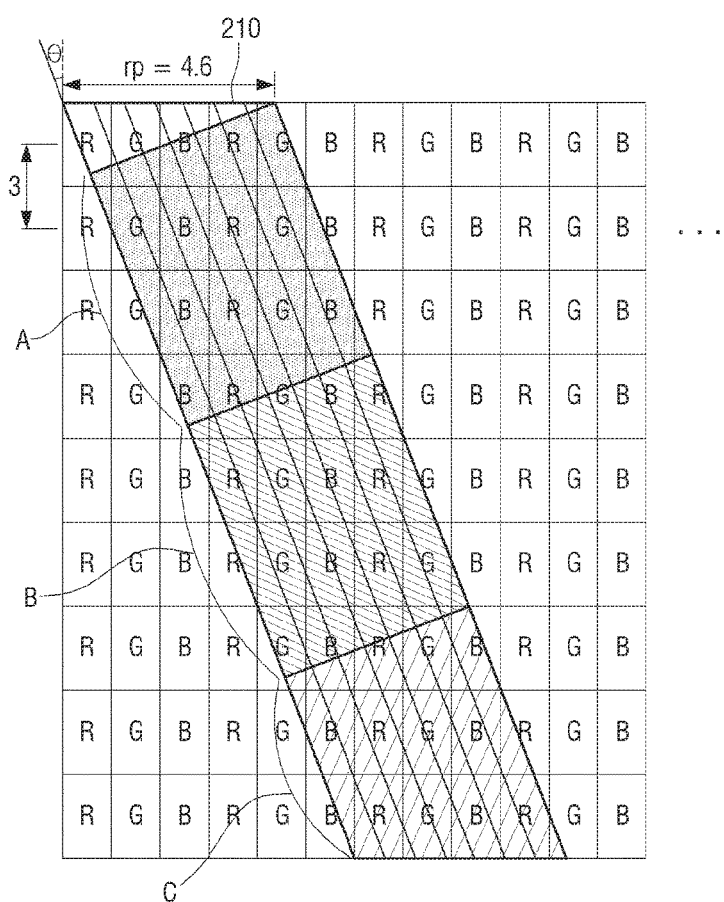

FIGS. 2A to 2C are diagrams illustrating a configuration of a 3D display apparatus according to various exemplary embodiments.

FIG. 2A is a block diagram illustrating a configuration of a 3D display apparatus according to an exemplary embodiment.

Referring to FIG. 2A, a 3D display apparatus 100 may include a display 110 and a processor 120.

The 3D display apparatus 100 may be implemented within various types of display apparatuses such as a TV, a monitor, a PC, a kiosk, a tablet PC, an electronic photo frame, or a portable phone.

An image input interface may receive an image. For example, the image input interface may receive the image from an external storage medium, a broadcasting station, and various external apparatuses such as a web server. The input image may be any one among a single view image, a stereoscopic image, and a multiview image. The single view image may be an image imaged through a general imaging apparatus. The stereoscopic image which is a 3D video image represented with only a left-eye image and a right-eye image may be a stereoscopic image imaged through a stereoscopic imaging apparatus. The stereoscopic imaging apparatus may be an imaging apparatus including two lenses and may be used to image a stereoscopic image. The multiview image may be 3D video image which provides various viewpoints for a plurality of directions through geometric correction, spatial synthesis, and the like on images imaged through one or more imaging apparatuses.

The image input interface may receive depth information of an image. The depth of the image may be a depth value assigned to each pixel of the image, and for example, the 8-bit depth may have gray scale values of from 0 (zero) to 255. For example, on the basis of black/white, the black (a low gray scale value) may represent a location far away from the viewer, and the white (a high gray scale value) may represent a location close to the viewer.

The depth information may indicate a depth of a 3D image, and the depth information may indicate a degree of binocular disparity between a left-eye image and a right-eye image constituting the 3D image. Degree of a 3D effect felt by the viewer may be changed according to the depth information. In response to the depth being large, because the binocular disparity is increased, the 3D effect may be relatively large. In response to the depth being small, because the binocular disparity is reduced, the 3D effect may be relatively small. The depth information may be acquired through a passive method using only 2D characteristics of an image, such as stereo matching, and an active method using equipment such as a depth camera. The depth information may include a depth map.

The depth map may refer to a table including pieces of depth information according to regions of an image. The regions may be pixel units, or may be defined as a preset region larger than the pixel unit. For example, among the gray scale values of 0 to 255, the depth map may have a form which represents a value smaller than a reference value, such as 127 or 128, as a negative (−) value, and a value larger than the reference value as a positive (+) value. The reference value of the focal plane may be arbitrarily selected between 0 (zero) and 255. The negative (−) value may refer to subduction and the positive (+) value may refer to protrusion.

The display 110 may provide a plurality of optical views in a viewing area of the user. For example, the display 110 may include a display panel 111 and a viewing area separation unit (viewing are separator) 112 which are configured to provide the plurality of optical views.

The display panel 111 may include a plurality of pixels, of which each includes a plurality of subpixels. The subpixels may include a red (R) subpixel, a green (G) subpixel, and a blue (B) subpixel. That is, the pixels including the R, G, and B subpixels may be arranged in a plurality of rows and a plurality of columns to constitute the display panel 111. The display panel 111 may be implemented within various display units such as a liquid crystal display (LCD) panel, a plasma display panel (PDP), an organic light emitting diode (OLED), a vacuum fluorescent display (VFD), a field emission display (FED), or an electro luminescence display (ELD).

The display panel 111 displays an image frame. For example, the display panel 111 may display a multiview image frame in which a plurality of views having different viewpoints may be repeatedly arranged in a serial manner.

In the case where the display panel 111 is an LCD panel, the display apparatus 100 may further include a backlight unit configured to supply light to the display panel 111, and a panel driver configured to drive pixels of the display panel 111 according to pixel values of the pixels constituting the image frame.

The viewing area separation unit 112 may be disposed in a front of the display panel 111, and provide different viewpoints according to a viewing area, that is, optical views. The viewing area separation unit 112 may include a lenticular lens or a parallax barrier.

For example, the viewing area separation unit 112 may include the lenticular lens including a plurality of lens areas. The lenticular lens may refract an image displayed in the display panel 111 through the plurality of lens areas. Each of the lens areas may be formed to have a size corresponding to at least one pixel, and may differently disperse light transmitting each pixel according to the viewing area.

In another example, the viewing area separation unit 112 may include the parallax barrier. The parallax barrier may include a transparent slit array including a plurality of barrier areas. The parallax barrier may block light through a slit between barrier areas, and allow images having different viewpoints according to viewing areas to be emitted.

FIG. 2B illustrates an example in which the viewing area separation unit 112 includes a lenticular lens array and the display panel 111 is an LCD panel according to an exemplary embodiment.

Referring to FIG. 2B, the display 110 may include the display panel 111, a lenticular lens array 112', and a backlight unit 113.

Referring to FIG. 2B, the display panel 111 may include a plurality of pixels divided into a plurality of columns. Image views having different viewpoints may be arranged in the columns. FIG. 2B illustrates a pixel arrangement form that a plurality of image views having different viewpoints, that is, first to eighth views are serially repeatedly arranged. That is, the pixel columns may be arranged with groups numbered by 1, 2, 3, 4, 5, 6, 7, and 8.

The backlight unit 113 may provide light to the display panel 111. The image views formed in the display panel 111 may be projected to the lenticular lens array 112' through the light provided from the backlight unit 113, and the lenticular lens array 112' may disperse the projected light for each image view and transfer the light to a viewer direction. That is, the lenticular lens array 112' generates exit pupils at a viewing distance. The viewing area separation unit 112 may be designed in such a manner that the exit pupils generated by the pixel columns are separated by an average binocular center distance of less than 65 mm. For example, a thickness and a diameter of the lenticular lens array 112' may be adjusted in response to the viewing area separation unit 112 including the lenticular lens array 112' as illustrated in FIG. 2B, and a distance between slits in a parallax barrier and the like may be adjusted in response to the viewing area separation unit 112 including the parallax barrier. The separated image lights may form optical views. That is, as illustrated in FIG. 2B, in response to a plurality of optical views being formed in the viewing zone and the left eye and right eye of the user being located in different optical views, the user may view the 3D image.

The viewing area separation unit 112 may be tilted at a certain angle and operated to improve image quality. The processor 120 may generate a multiview image frame for output by dividing the image frame into a plurality of views based on the slanted angle of the viewing area separation unit 112 and combining the divided views. Accordingly, the user may not view an image displayed in the subpixels of the display panel 111 outside of a slanted region in either a vertical direction or a horizontal direction, but the user may view an image displayed in the slanted region. Accordingly, the viewer may view not a full region of one subpixel, but the viewer may view a partial region of the subpixel. For example, as illustrated in FIG. 2C, the user may view a region 210 slanted at a preset angle through the viewing area separation unit 112. In this example, the user may view a pixel region (hereinafter, referred to as visible pixel region) in the slanted region, as illustrated in FIG. 2C, through an optical operation of the viewing area separation unit 112. Sizes of pixels A, B, and C provided in the visible pixel region may be determined by a pitch of a lenticular lens.

The processor 120 may control an overall operation of the display apparatus 100.

The processor 120 may perform render a plurality of image views having different viewpoints.

For example, in response to the input image being a 2D image, the processor 120 may render a plurality of image views having the different viewpoints based on depth information extracted in 2D/3D conversion. In another example, in response to the plurality of image views having the different viewpoints and a plurality of pieces of depth information corresponding thereto being input, the processor 120 may render the fixed number (hereinafter, referred to as N) of image views based on at least one of the plurality of input image views and one of the plurality of pieces of input depth information. In another example, in response to only a plurality of image views having different viewpoints being input, the processor 120 may extract depth information from the plurality of image views and render the N image views based on the extracted depth information.

For example, the processor 120 may select one of a left-eye image and a right-eye image which constitute a 3D image as a reference view (or a center view) and generate a leftmost view and a rightmost view as a basis of the multiview image. The processor 120 may generate the leftmost view and the rightmost view based on the corrected depth information corresponding to the one of the left-eye image and the right-view image selected as the reference view. In response to the leftmost view and the rightmost view being generated, the processor 120 may render the N image views by generating a plurality of interpolation views between the center view and the leftmost view, and generating a plurality of interpolation views between the center view and the rightmost view. However, this is not limited thereto, and an extrapolation view generated through an extrapolation method may be generated. In response to the multiview image being rendered based on a 2D image and depth information, the 2D image may be selected as the center view. However, the above-described rendering operation is merely exemplary, and the processor 120 may render the plurality of image views through various methods other than the above-described rendering operation. In some examples, the processor 120 may adjust the depth of the input image based on the depth information according to various criteria. In these examples, the processor 120 may render the plurality of image views based on the depth-adjusted image.

The processor 120 may generate a multiview image to be displayed by the display 110 based on subpixel values constituting the plurality of rendered image views having the different viewpoints. The processor 120 may include one or more among a central processing unit (CPU), an application processor (AP), and a communication processor (CP).

The processor 120 may perform rendering on the plurality of image views having the different viewpoints based on the depth of the input image, and provide the multiview image by arranging the plurality of image views on the display panel 111 in a preset arrangement pattern.

The processor 120 may estimate crosstalk which occurs between the image views having different viewpoints based on arrangement positions of the plurality of image views, and provide the multiview image by performing crosstalk inverse compensation according to the estimated crosstalk. The number of the image views may be larger than the number of optical views, and each of the optical views may be provided based on at least two image views having different viewpoints.

For example, the processor 120 may estimate the crosstalk based on a difference between an output pixel region of the display panel 111 and a corresponding visible pixel region provided to the user through the image views.

The processor 120 may perform theoretical modeling of image view-based crosstalk on a reference image view based on a slanted angle of the plurality of visible pixel regions provided as the image views, the number of image views, and a rendering pitch.

The processor 120 may derive improved crosstalk by reflecting a Gaussian optical profile to the modeled theoretical crosstalk.

The processor 120 may calculate a crosstalk occurrence weight of at least one image view which provides the crosstalk to the reference image view based on the slanted angle, the number of image views, and the rendering pitch, and perform the crosstalk inverse compensation by generating a crosstalk matrix according to the calculated weight.

The processor 120 may generate an epipolar image corresponding to each pixel line by combining pixel lines of the plurality of rendered image views, and perform the crosstalk inverse compensation by applying a crosstalk inverse filter to the generated epipolar image. The crosstalk inverse filter may be a filter in which an inverse matrix of the crosstalk matrix is implemented.

The processor 120 may adjust a filtering coefficient of the crosstalk inverse filter based on a characteristic of the input image and perform the crosstalk inverse compensation by reflecting an adjusted filtering coefficient.

The processor 120 may divide the crosstalk inverse filter into an angular smoothing filter and an angular sharpening filter, and adjust the filtering coefficient of the crosstalk inverse filter by adjusting coefficients of the angular smoothing filter and the angular sharpening filter based on the characteristic of the input image. This is be described in additional detail below.

The processor 120 may acquire a plurality of target image views in which the plurality of rendered image views are corrected based on the epipolar image which is subject to the crosstalk inverse compensation, and provide the multiview image by arranging the plurality of image views on the display panel 111 in a preset arrangement pattern based on the plurality of target image views.

The processor 120 may compensate a pixel value of a region having a pixel value of less than a preset threshold value according to the crosstalk inverse compensation with a pixel value of a neighboring region which is larger than or equal to the preset threshold value.

For example, in response to the crosstalk inverse compensation being performed based on the epipolar image generated on the basis of the rendered multiview image, the processor 120 may compensate the pixel value of the region having the pixel value of less than the preset threshold value in the epipolar image according to the crosstalk inverse compensation with a pixel value of a neighboring region. That is, the processor 120 may compensate a pixel value of a region having a negative pixel value in the epipolar image according to the crosstalk inverse compensation with a positive pixel value of the neighboring region.

In another example, in response to the crosstalk inverse compensation being performed based on the epipolar image generated on the basis of the rendered multiview image, the processor 120 may compensate the pixel value of the region having the pixel value of less than the preset threshold value in the epipolar image according to the crosstalk inverse compensation with a pixel value of a corresponding region in the input image. That is, the processor 120 may compensate the pixel value of the region having the negative pixel value in the epipolar image according to the crosstalk inverse compensation with a positive pixel value of the corresponding region in the input image In another example, in response to the crosstalk inverse compensation being performed based on the epipolar image generated on the basis of the rendered multiview images, the processor 120 may compensate the pixel value of the region having the pixel vale of less than the preset threshold value in the epipolar image according to the crosstalk inverse compensation with a pixel value, on which the crosstalk inverse compensation is performed, in a previous image of the input image. That is, in response to the pixel value of the region having the negative pixel value in the epipolar image corresponding to a current image frame according to the crosstalk inverse compensation being a positive pixel value in an epipolar image corresponding to a previous image frame according to the crosstalk inverse compensation, the processor 120 may compensate the pixel value of the region having the pixel value of less than the preset threshold value with a pixel value, on which the crosstalk inverse compensation is performed, in the previous image frame.

Figure 3A:
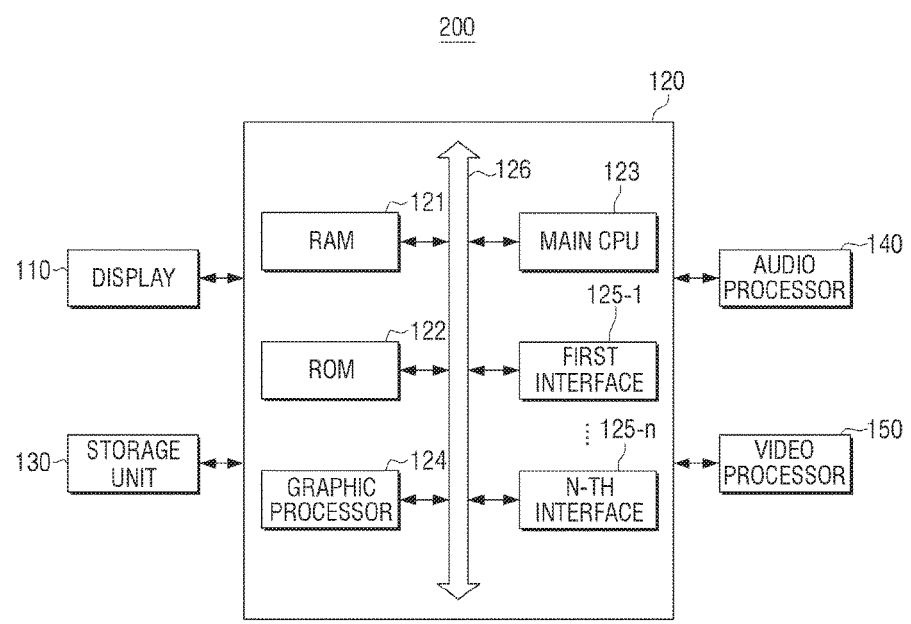
FIGS. 3A and 3B are block diagrams illustrating a configuration of a 3D display apparatus according to various exemplary embodiments.
Figure 3B:
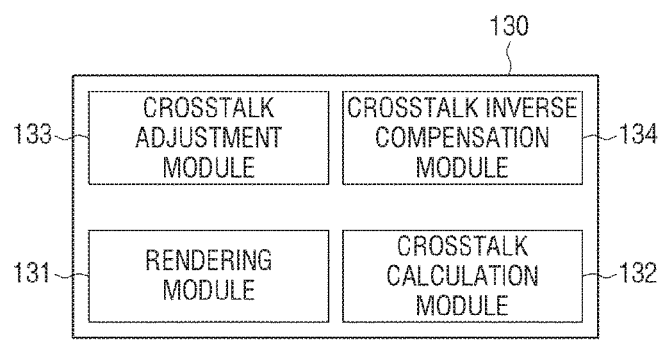

FIGS. 3A and 3B are configurations of a 3D display apparatus according to various exemplary embodiments.

Referring to FIG. 3A, a 3D display apparatus 200 may include a display 110, a processor 120, and a storage unit 130. The configuration of FIG. 3A may be a detailed configuration of the 3D display apparatus 100 illustrated in FIG. 2A. Detailed description for the configuration of the 3D display apparatus 200 in FIG. 3A overlapping that of the 3D display apparatus 100 will be omitted.

The processor 120 may include a random access memory (RAM) 121, a read only memory (ROM) 122, a main CPU 123, a graphic processor 124, first to n-th interfaces 125-1 to 125-*n*, and a bus 126.

The RAM 121, the ROM 122, the main CPU 123, the graphic processor 124, the first to n-th interfaces 125-1 to 125-*n*, and the like may be electrically coupled through the bus 126.

The first to n-th interfaces 125-1 to 125-*n* may be coupled to the above-described components. One of the interfaces may be a network interface coupled to an external apparatus through a network.

The main CPU 123 accesses the storage unit 130 to perform booting using an operating system (O/S) stored in the storage unit 130. The main CPU 123 performs various operations using a variety of modules, programs, content, data, and the like stored in the storage unit 130. For example, the main CPU 123 may perform operations according to various exemplary embodiments based on a rendering module 131, a crosstalk calculation module 132, a crosstalk adjustment module 133, and a crosstalk inverse compensation module 134 illustrated in FIG. 3B.

A command set and the like for system booting may be stored in the ROM 122. In response to a turn-on command being input to supply power, the main CPU 123 may copy the O/S stored in the storage unit 130 to the RAM 121 according to a command stored in the ROM 122, and execute the O/S to boot a system. In response to the booting being completed, the main CPU 123 may copy various programs stored in the storage unit 130 to the RAM 121, and execute the programs copied to the RAM 121 to perform various operations.

The graphic processor 124 may be configured to generate a screen including various objects, such as an icon, an image, text, and the like, using an operation unit and a rendering unit. The operation unit may calculate attribute values such as coordinate values, in which the objects are to be displayed according to a layout of a screen, shapes, sizes, and colors based on a received control command. The rendering unit may generate a screen having various layouts including the objects based on the attribute values calculated in the operation unit.

The above-described operation of the processor 120 may be performed through the program stored in the storage unit 130.

The storage unit 130 may store an O/S software module and a variety of data, such as various types of multimedia content, for driving the 3D display apparatus 200. For example, the storage unit 130 may store the programs, such as the rendering module 131, the crosstalk calculation module 132, the crosstalk adjustment module 133, and the crosstalk inverse compensation module 134 illustrated in FIG. 3B, and a variety of information for implementing various exemplary embodiments such as an algorithm for applying Gaussian refinement to be described and an image characteristic analysis algorithm.

Figure 4A:
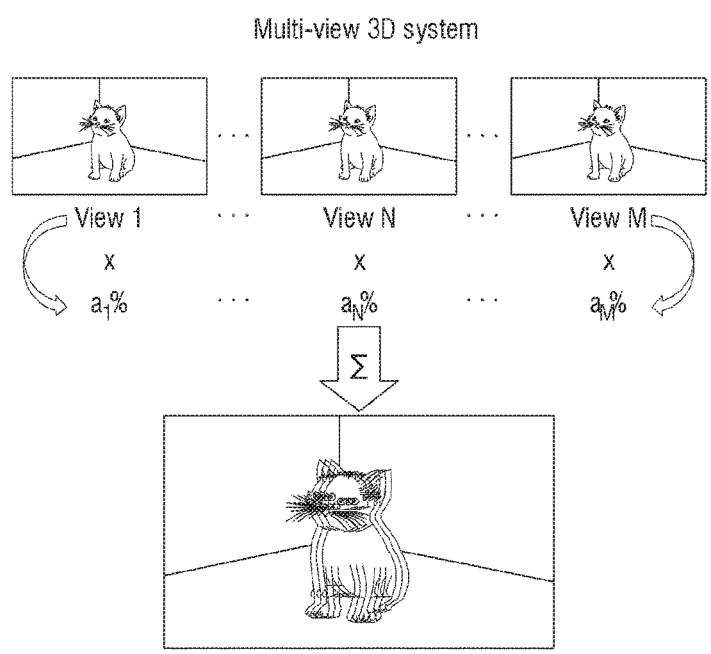
Figure 4C:
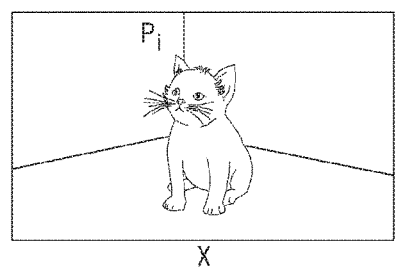
Figure 4C:
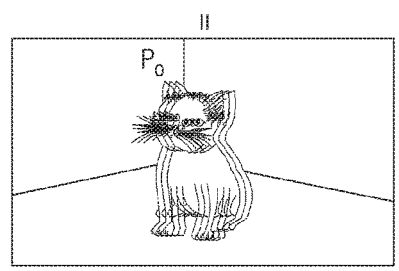

FIGS. 4A to 4C are views explaining a method of performing crosstalk inverse compensation according to various exemplary embodiments.

As illustrated in FIG. 4A, crosstalk in the 3D display apparatus may occur in neighboring image views as well as all image views. Further, the degree of crosstalk occurrence may be simply implemented in a crosstalk matrix form.

For example, in response to the crosstalk of a neighboring image view in four image views is a % and crosstalk of next neighboring image view is b %, the crosstalk may be represented as illustrated in FIG. 4B.

As illustrated in FIG. 4C, an output image may be affected by the crosstalk, and may be represented with the following Equation 1.

$$P_o = X \cdot P \qquad \text{[Equation 1]}.$$

Here, $P_i$ is an input image, $P_o$ is an output image, and X is a crosstalk matrix.

A new input may be calculated using the following Equation 2 to reduce the crosstalk effect.

$$P'_i = X^{-1} \cdot P_i \qquad \text{[Equation 2]}$$

Then, a new output calculated using the following Equation 3 may be input as an original input.

$$P'_o = X \cdot X^{-1} \cdot P_i = P_i \qquad \text{[Equation 3]}$$

The crosstalk for constituting the crosstalk matrix may be calculated through a theoretical area ratio calculation according to a pixel arrangement of a plurality of image views.

Figure 5:
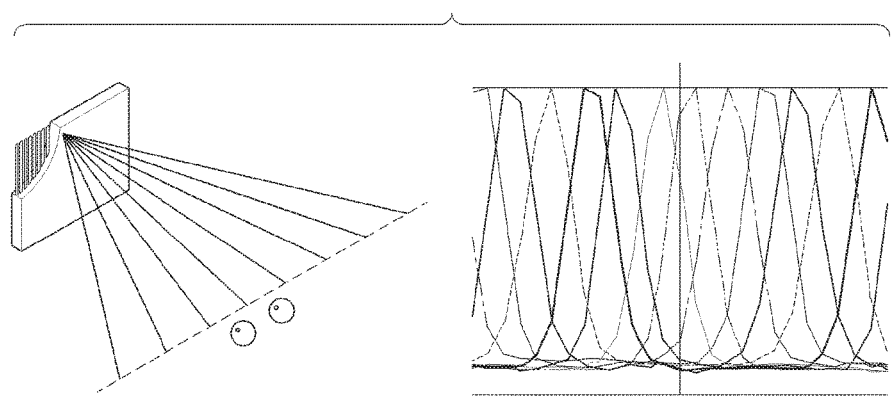
FIGS. 5 and 6 are diagrams illustrating comparison between an optical view-based crosstalk calculation method and an image view-based crosstalk calculation method according to various exemplary embodiments.
Figure 5:
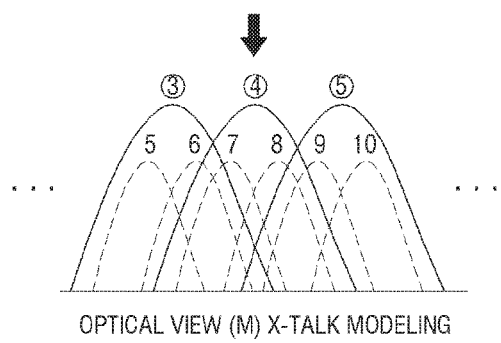
Figure 6:
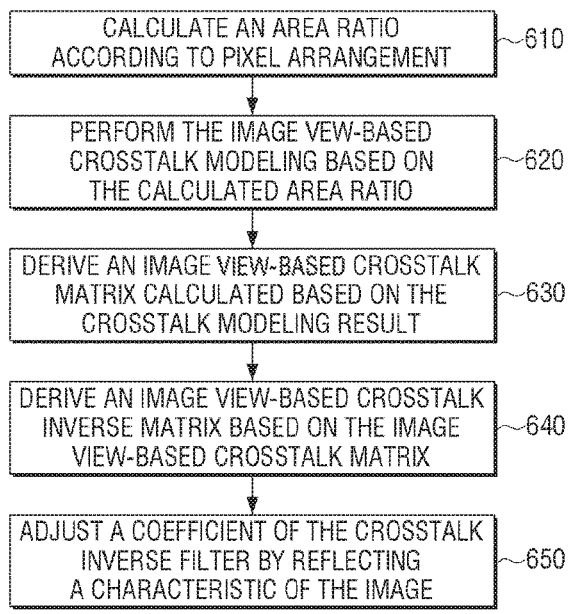

FIGS. 5 and 6 are diagrams comparing an optical view-based crosstalk calculation method and an image view-based crosstalk calculation method according to an exemplary embodiment.

FIG. 5 is a diagram illustrating the optical view-based crosstalk calculation method. The crosstalk may be measured as a degree (ratio of luminance) in which luminance of a reference optical view to be elevated is affected by luminance of an optical view having a different viewpoint from the reference optical view. For example, as the optical view-based crosstalk calculation method, the International Organization for Standardization (ISO) method and an International Electrotechnical Commission (IEC) method may be used. The ISO method and the IEC method may calculate the crosstalk through optical view profiling through optical luminance measurement and the like, but exemplary embodiments may calculate the image view-based crosstalk through theoretical calculation.

FIG. 6 is a diagram illustrating image view-based crosstalk calculation method according to an exemplary embodiment. As illustrated in FIG. 6, the 3D display apparatus may calculate the theoretical crosstalk through an area ratio calculation according to the pixel arrangement of the plurality of image views (610).

For example, the 3D display apparatus may perform the image view-based crosstalk modeling through the area ratio calculation according to the pixel arrangement of the plurality of image views based on the pixel arrangement on the display panel 111 according to the of image views N, the slanted angle θ of the viewing area separation unit 120, the rendering pitch rp, and the like.

Figure 7:
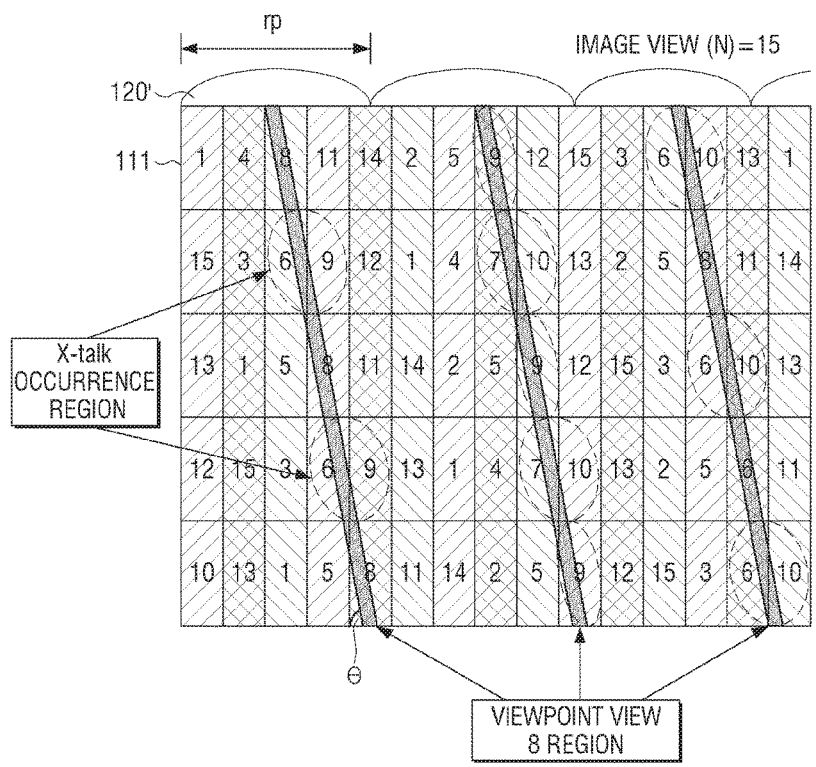

FIG. 7 illustrates a pixel arrangement state of the display panel 111 in response to the number N of image views being 15 according to an exemplary embodiment. A view in a pixel position (i, j) may be allocated based on the following Equation 4.

$$p_{ij} = \text{round}\left(i \cdot \left(-\frac{N}{\left(\frac{\tan(\theta)}{3} \cdot rp\right)}\right) + j \cdot \frac{N}{rp}\right) \quad \text{[Equation 4]}$$

Here, $p_{ij}$ is a pixel at position (i, j), θ is a slanted angle of the viewing area separation unit 120 (for example, the lenticular lens), rp is a rendering pitch, and N is the number of image views.

In response to the reference image view being an 8-viewpoint image view, the 3D display apparatus may determine a crosstalk occurrence region based on a pixel arrangement, and calculate crosstalk in the determined crosstalk occurrence region.

Figure 8:
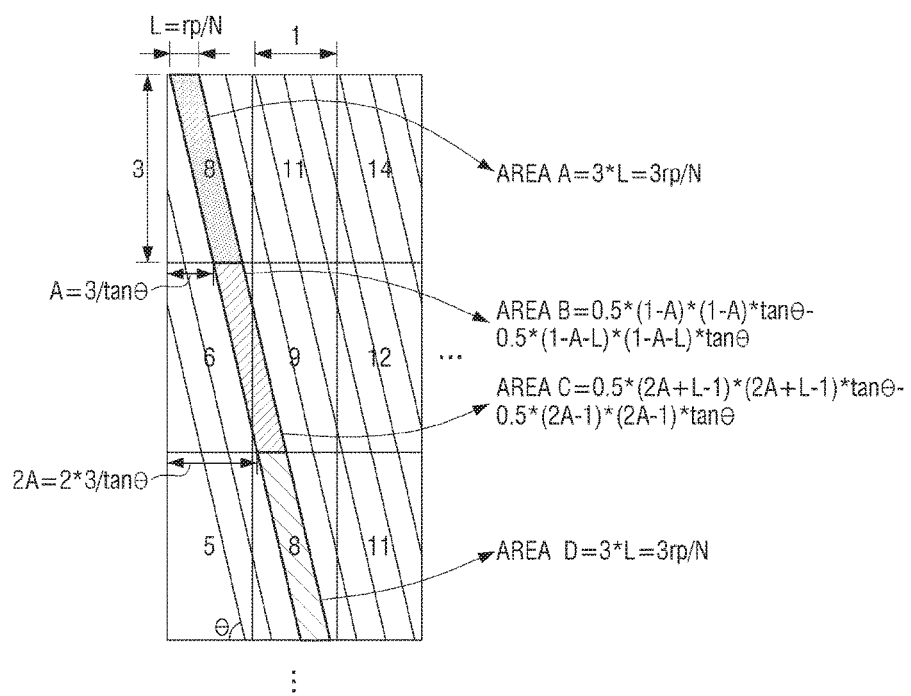

FIG. 8 is a diagram illustrating a detailed method of calculating an area ratio in a crosstalk occurrence region according to an exemplary embodiment.

As illustrated in FIG. 8, in response to the reference image view being a 8-viewpoint image view, an A region and a B region among A, B, C, and D regions may correspond to the 8-viewpoint image view, the B region may correspond to a 6-viewpoint image view, and the C region may correspond to a 9-viewpoint image view. Areas of the A, B, C, and D regions may be calculated through Equations as illustrated in FIG. 8.

In response to the area ratio being calculated as illustrated in FIG. 8, the 3D display apparatus may perform the image view-based crosstalk modeling based on the calculated area ratio (see 620 of FIG. 6). However, the theoretical crosstalk modeling according to an exemplary embodiment may be applied to the optical view-based crosstalk modeling in the same/similar manner.

Figure 9A:
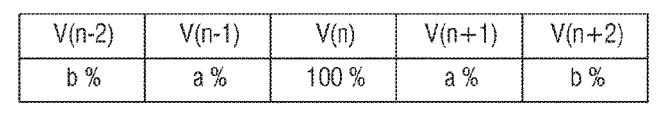

FIG. 9A is a diagram representing theoretically calculated crosstalk degree with a numerical value according to an exemplary embodiment. As illustrated in FIG. 9A, the crosstalk degree of neighboring views V(n−2), V(n−1), V(n+1), and V(n+2) with respect to a reference image view V(n) may be derived through the area calculation method as illustrated in FIG. 8. However, the number of neighboring views illustrated in FIG. 9A is merely exemplary, and the number of neighboring image views affecting the reference image view V(n) is not limited thereto.

Next, the 3D display apparatus may derive an image view-based crosstalk matrix calculated based on the crosstalk modeling result (see 630 of FIG. 6). FIG. 9B illustrates an example of the image view-based crosstalk matrix X calculated based on the crosstalk modeling result as illustrated in FIG. 9A.

The 3D display apparatus may derive an image view-based crosstalk inverse matrix based on the image view-based crosstalk matrix (see 640 of FIG. 6).

Figure 10:
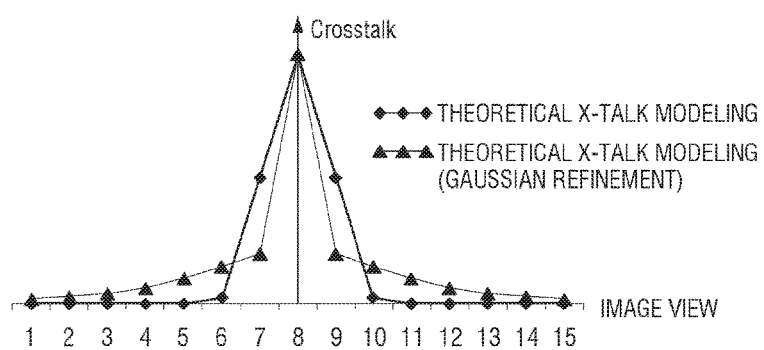

According to another exemplary embodiment, the 3D display apparatus may adjust the theoretically modeled crosstalk by reflecting the Gaussian optical profile after the theoretical crosstalk modeling through the method as illustrated in FIG. 8. For example, the 3D display apparatus may perform Gaussian curve fitting on the theoretically modeled crosstalk and adjust sharpness. The 3D display apparatus may perform optimum crosstalk modeling through the Gaussian refinement in a form as illustrated in FIG. 10. In this example, the 3D display apparatus may perform the Gaussian curve fitting of the theoretically modeled crosstalk by applying the Gaussian optical profile.

According to another exemplary embodiment, the 3D display apparatus may derive the crosstalk inverse matrix, and then adjust a coefficient of the crosstalk inverse filter by reflecting a characteristic of the image (see 650 of FIG. 6). The crosstalk inverse filter may be a filter in which an inverse matrix of the crosstalk matrix is implemented in a filter type.

Figure 11:
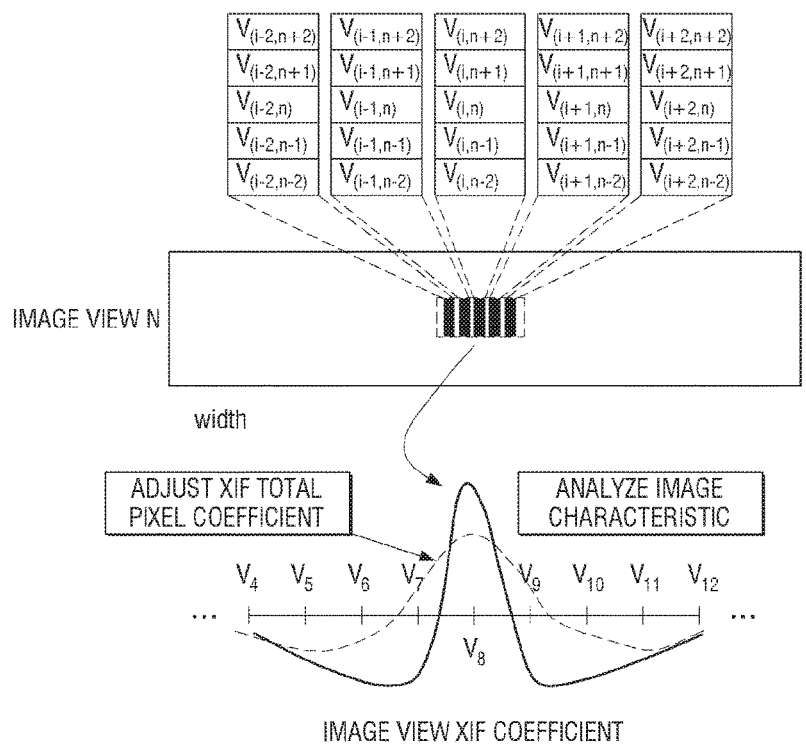

For example, as illustrated in FIG. 11, the 3D display apparatus may calculate a gradient of an image view based on an epipolar image, and adjust the coefficient of the crosstalk inverse filter according to the calculated view gradient.

Referring to FIG. 11, the 3D display apparatus may calculate a view gradient (i, n) for a target pixel region based on pixel values of a reference view V(i, n) and neighboring views V(i, n−1), V(i, n−2), V(i, n+1), and V(i, n+2) of the target pixel region. For example, the view gradient (i, n) may be calculated based on the following Equation 5.

$$\text{view\_grad}(i, n) = \quad \text{[Equation 5]}$$
$$W_1 X \frac{|V(i, n) - V(i, n-1)| + |V(i, n) - V(i, n+1)|}{2} +$$
$$W_2 X \frac{V(i, n) - V(i, n-2)| + |V(i, n) - V(i, n+2)|}{2}$$

The 3D display apparatus may calculate the view gradients for the neighboring pixel regions of the target pixel region through the same method described above, and calculate a view gradient smoothing value view grad smoothing (i, n) based on the calculated view gradients view grad(i, n), view grad(i, n−1), view grad(i, n+1), and view grad(i, n+2)) for the pixel regions. For example, the 3D display apparatus may calculate the view gradient smoothing value by averaging the view gradient values for the pixel regions. In this example, the 3D display apparatus may calculate the view gradient smoothing value view grad smoothing (i, n) based on the following Equation 6.

$$\text{view\_grad\_smoothing}(i,n)((\text{view\_grad}(i,n)+\text{view\_grad}(i-1,n)+\text{view\_grad}(i+1,n)+\text{view\_grad}(i-2,n)++\text{view\_grad}(i+2,n))/5 \quad \text{[Equation 6]}$$

Figure 12B:
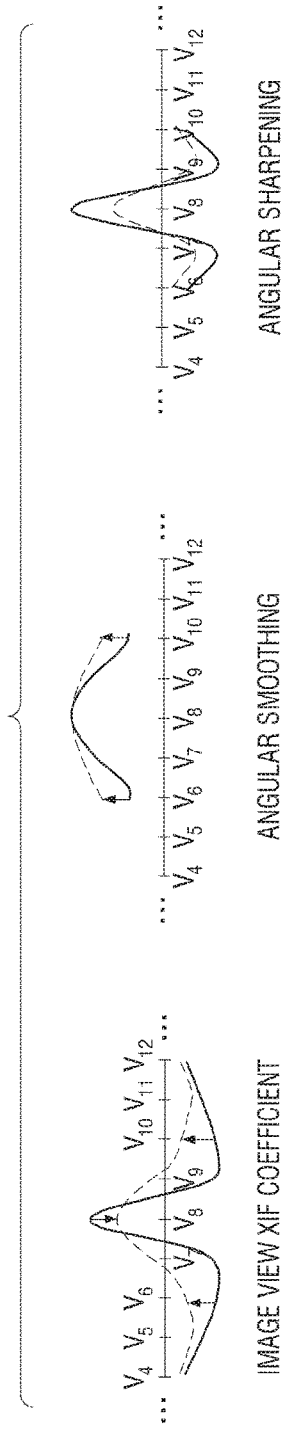
Figure 12C:
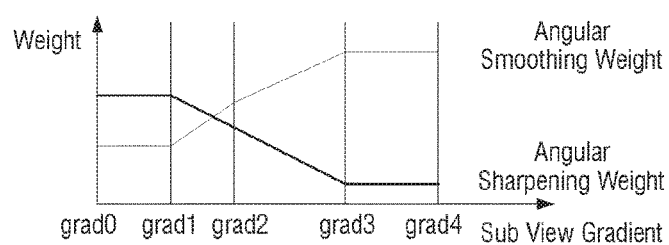

FIGS. 12A to 12C are diagrams illustrating a method of adjusting a coefficient of a crosstalk inverse filter according to various exemplary embodiments.

According to an exemplary embodiment, the 3D display apparatus may adjust a coefficient of a crosstalk inverse filter based on the view gradient value or the view gradient smoothing value as described in FIG. 11.

For example, the crosstalk inverse filter may be divided into an angular smoothing filter and an angular sharpening filter as illustrated in FIG. 12A. That is, the crosstalk inverse filter may be a filter in which the angular smoothing filter and the angular sharpening filter are combined.

According to an exemplary embodiment, the 3D display apparatus may divide the crosstalk inverse filter into the angular smoothing filter and the angular sharpening filter, adjust coefficients of the divided filters, and adjust the coefficient of the crosstalk inverse filter by combining the divided filters. However, in some examples, the 3D display apparatus may adjust the filter coefficient without dividing the crosstalk inverse filter into the angular smoothing filter and the angular sharpening filter.

As illustrated in FIG. 12B, the 3D display apparatus may adjust the coefficients of the angular smoothing filter and the angular sharpening filter by applying a weight corresponding to the view gradient value or the view gradient smoothing value in a state that the crosstalk inverse filter is divided into the angular smoothing filter and the angular sharpening filter. The weight corresponding to the view gradient value or the view gradient smoothing value may be previously set in a form as illustrated in FIG. 12C. In response to the coefficients of the angular smoothing filter and the angular sharpening filter being adjusted, the 3D display apparatus may acquire the coefficient-adjusted crosstalk inverse filter based on the adjusted coefficients.

The 3D display apparatus may minimize deterioration of image quality such as overshoot artifact occurring in an edge region and the like according to the crosstalk inverse compensation based on the coefficient-adjusted crosstalk inverse filter based on the image characteristic.

Figure 13:
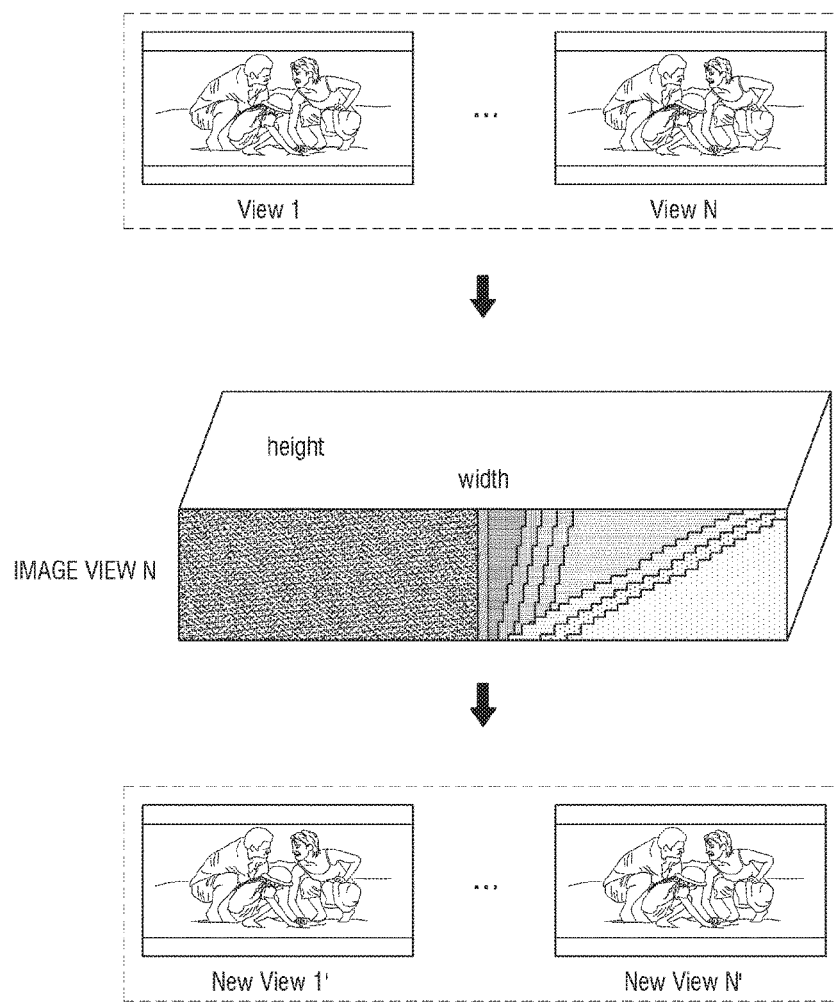
FIG. 13 is a diagram illustrating a crosstalk inverse compensation method according to an exemplary embodiment.

FIG. 13 is a diagram illustrating a crosstalk inverse compensation method according to an exemplary embodiment.

According to the method illustrated in FIG. 13, the 3D display apparatus may generate an epipolar image corresponding to each pixel line by combining pixel lines of a plurality of rendered image views View 1 to View N, and perform crosstalk inverse compensation by applying the crosstalk inverse filter to the generated epipolar image. The crosstalk inverse filter may be a filter in which the filtering coefficient is adjusted based on the characteristic of the input image as illustrated in FIG. 11.

The 3D display apparatus may acquire a plurality of target image views New View 1' to New View N' based on the epipolar image which is subject to the crosstalk inverse compensation as illustrated in FIG. 13.

The 3D display apparatus may provide a multiview image by arranging the plurality of generated target image views New View 1' to New View N' on the display panel 111 in a preset arrangement pattern.

Figure 14:
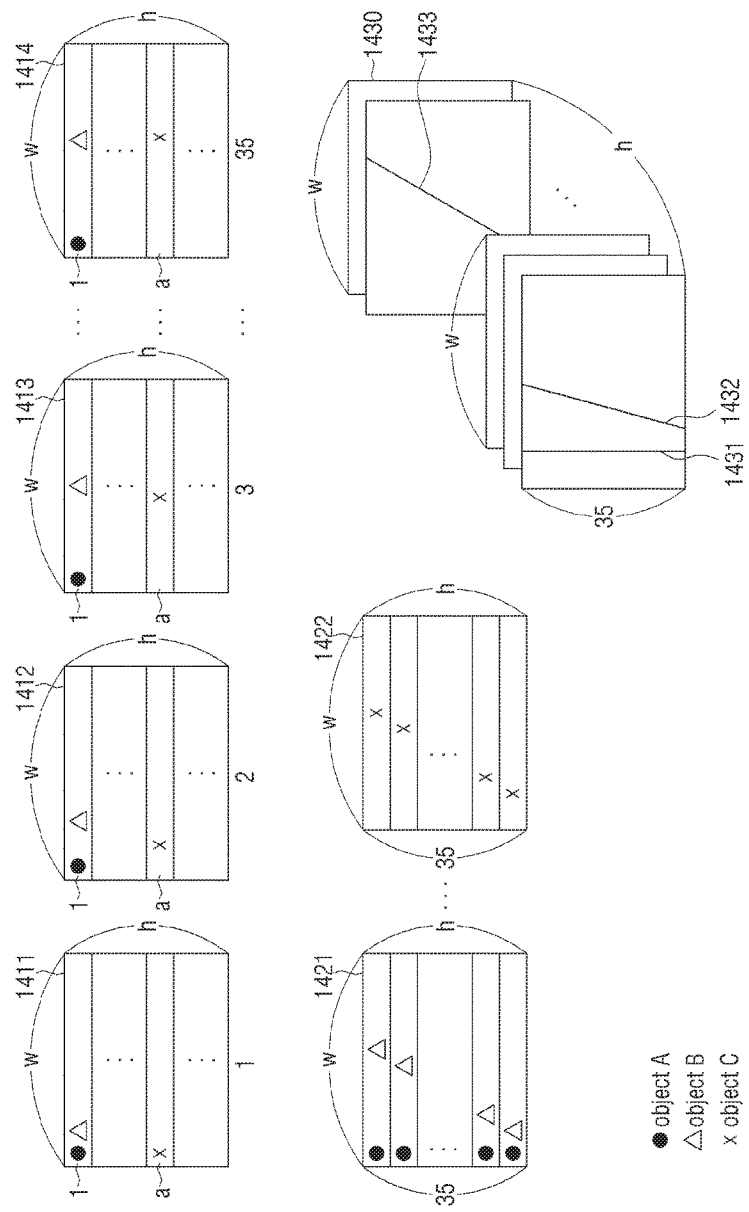
FIG. 14 is a diagram illustrating an epipolar image generation method according to an exemplary embodiment.

FIG. 14 is a diagram illustrating a method of generating an epipolar image according to an exemplary embodiment. In FIG. 14, rendering is performed on 35 multiview images having a height h and a width w.

Epipolar images corresponding to pixel lines may be generated by combining the pixel lines of the 35 multiview images 1411 to 1414. For example, as illustrated in FIG. 14, a first image 1421 may be generated by combining first pixel lines of the multiview images 1411 to 1414, and a-th image 1422 may be generated by combining a-th pixel lines. Accordingly, an epipolar image 1430 may be generated by serially combining h generated images corresponding to the number of pixel lines.

In this example, a line having a preset form may be represented according to a depth size of an object in an image corresponding to each pixel line, that is, a depth size of a pixel region. For example, because a depth of an object A (•) is 0 (zero), the object A (•) may be located in the same position in the 35 multiview images. Because an object B (Δ) has a depth of a preset size, the positions of the object B (Δ) may be gradually changed in the 35 multiview images, and the position change may be represented with a preset line form. Referring to FIG. 14, a line corresponding to the object A (•) having the depth value of 0 (zero) may be represented with a vertical line 1431, and the object B (Δ) and an object C (X) having depths of preset sizes may be represented with oblique lines 1432 and 1433.

Figure 15:
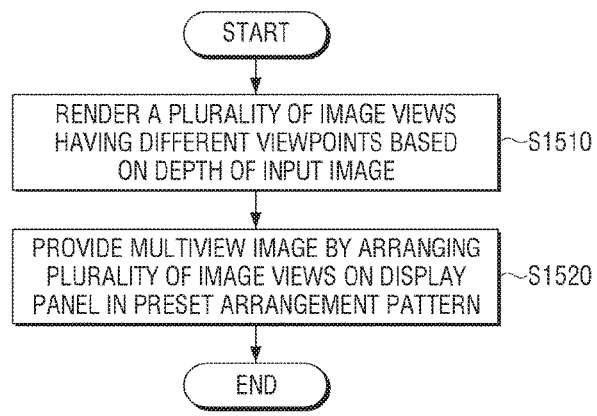
FIG. 15 is a flowchart illustrating a control method of a 3D display apparatus according to an exemplary embodiment.

FIG. 15 is a flowchart illustrating a control method of a 3D display apparatus according to an exemplary embodiment.

According to the control method of a 3D display apparatus illustrated in FIG. 15, the 3D display apparatus may render a plurality of image views having different viewpoints based on a depth of an input image (S1510). The 3D display apparatus may include a display including a display panel and a viewing area separation unit disposed in a front of the display panel and configured to provide optical views having different viewpoints in a viewing zone of a user.

The 3D display apparatus may provide a multiview image by arranging the plurality of rendered image views on the display panel in a preset arrangement pattern (S1520). The 3D display apparatus may estimate crosstalk occurring between the image views having the different viewpoints based on arrangement positions of the plurality of image views, and provide the multiview image using the plurality of view images corrected by performing crosstalk inverse compensation according to the estimated crosstalk.

The number of image views may be larger than the number of optical views. Each of the optical views may be provided based on image views having at least two different viewpoints.

In operation S1520 of providing the multiview image, the 3D display apparatus may estimate the crosstalk based on a difference between an output pixel region of the display panel and a corresponding visible pixel region provided to the user through the image views.

The viewing area separation unit may operate to provide a plurality of visible pixel regions slanted to a preset angle as the optical views. In operation S1520 of providing the multiview image, the 3D display apparatus may perform theoretical crosstalk modeling on a reference image view based on the preset angle, the number of image views, and a rendering pitch.

In operation S1520 of providing the multiview image, the 3D display apparatus may derive improved crosstalk by reflecting a Gaussian optical profile to the modeled theoretical crosstalk.

In operation S1520 of providing the multiview image, the 3D display apparatus may calculate a crosstalk occurrence weight for at least one image view which provides the crosstalk to the reference image view based on the preset slanted angle of the viewing area separation unit, the number of image views, and the rendering pitch, and perform the crosstalk inverse compensation by generating a crosstalk matrix according to the calculated weight.

In operation S1520 of providing the multiview image, the 3D display apparatus may generate an epipolar image corresponding to each of pixel lines by combining the pixel lines of the plurality of rendered image views, and perform the crosstalk inverse compensation by applying a crosstalk inverse filter to the generated epipolar image. The crosstalk inverse filter may be a filter in which an inverse matrix of the crosstalk matrix is implemented in a filter type.

In operation S1520 of providing the multiview image, the 3D display apparatus may adjust a filtering coefficient of the crosstalk inverse filter based on a characteristic of the input image and perform the crosstalk inverse compensation by reflecting an adjusted filtering coefficient.

In operation S1520 of providing the multiview image, the 3D display apparatus may divide the crosstalk inverse filter into an angular smoothing filter and an angular sharpening filter, and adjust the coefficient of the crosstalk inverse filter by adjusting coefficients of the angular smoothing filter and the angular sharpening filter based on the characteristic of the input image.

In operation S1520 of providing the multiview image, the 3D display apparatus may acquire a plurality of target image views in which the plurality of rendered image views are corrected based on the epipolar image which is subject to the crosstalk inverse compensation, and provide the multiview image by arranging the plurality of image views on the display panel in a preset arrangement pattern based on the plurality of target image views.

According to the above-described various exemplary embodiments, a sharp 3D image may be provided by applying crosstalk inverse filtering through theoretical crosstalk modeling to the autostereoscopic 3D display apparatus.

The control method of a 3D display apparatus according to the above-described various exemplary embodiments may be implemented as a program and provided to the autostereoscopic 3D display apparatus.

For example, a non-transitory computer-readable medium, in which a program which when executed, causes a device to perform the operations of rendering on a plurality of image views having different viewpoints based on a depth of an input image, correcting the plurality of image views by performing crosstalk inverse compensation according to a crosstalk estimation result based on arrangement positions of the plurality of image views on the display panel, and providing a multiview image based on the plurality of corrected image views is stored, may be provided.

The non-transitory computer-recordable medium is not a medium configured to temporarily store data, such as a register, or a cache, but an apparatus-readable medium configured to permanently or semi-permanently store data. For example, the above-described various applications or programs may be stored in a non-transitory apparatus-readable medium such as a compact disc (CD), a digital versatile disc (DVD), a hard disc, a Blu-ray disc, a universal serial bus (USB), a memory card, or a read only memory (ROM).

The foregoing exemplary embodiments and advantages are merely exemplary and are not to be construed as limiting the present disclosure. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A three-dimensional (3D) display apparatus comprising:
a display comprising a display panel and a viewing area separator disposed at a front side of the display panel and configured to provide a plurality of optical views having different viewpoints to a viewing zone; and
a processor configured to render a plurality of image views having different viewpoints and provide a multiview image by arranging the plurality of image views on the display panel in an arrangement pattern,
wherein the processor is further configured to:
estimate a crosstalk occurring between the plurality of image views based on the arrangement pattern, a rendering pitch and an angle which a pixel region provided to the viewing zone is slanted by the viewing area separator,
correct the plurality of image views by performing crosstalk inverse compensation according to the estimated crosstalk, and
provide the multiview image based on the crosstalk inverse compensation.

2. The 3D display apparatus as claimed in claim 1, wherein a number of the plurality of image views is greater than a number of the plurality of optical views, and
each of the plurality of optical views is provided based on at least two image views of the plurality of image views having different viewpoints.

3. The 3D display apparatus as claimed in claim 1, wherein the processor is further configured to determine the estimated crosstalk based on a difference between an output pixel region of the display panel and a corresponding visible pixel region provided through the plurality of image views.

4. The 3D display apparatus as claimed in claim 3, wherein
the processor is further configured to perform theoretical crosstalk modeling on a reference image view based on the arrangement pattern, the angle, a number of the plurality of image views, and the rendering pitch.

5. The 3D display apparatus as claimed in claim 4, wherein the processor is further configured to perform the theoretical crosstalk modeling on the reference image view based on the arrangement pattern, the angle, a number of the plurality of image views, the rendering pitch, and reflecting a Gaussian optical profile to the modeled theoretical crosstalk.

6. The 3D display apparatus as claimed in claim 4, wherein the processor is further configured to determine a crosstalk occurrence weight for at least one image view of the plurality of image views based on the arrangement pattern, the angle, a number of the plurality of image views, and the rendering pitch, and perform the crosstalk inverse compensation by generating a crosstalk matrix according to the crosstalk occurrence weight.

7. The 3D display apparatus as claimed in claim 6, wherein the processor is further configured to generate an epipolar image by combining a plurality of pixel lines of the plurality of rendered image views, and perform the crosstalk inverse compensation by applying a crosstalk inverse filter to the generated epipolar image, and
the crosstalk inverse filter generates an inverse matrix of the crosstalk matrix.

8. The 3D display apparatus as claimed in claim 7, wherein the processor is further configured to adjust a filtering coefficient of the crosstalk inverse filter based on a characteristic of an input image and perform the crosstalk inverse compensation by reflecting the adjusted filtering coefficient.

9. The 3D display apparatus as claimed in claim 8, wherein the processor is further configured to divide the crosstalk inverse filter into an angular smoothing filter and an angular sharpening filter, and adjust the filtering coefficient of the crosstalk inverse filter by adjusting coefficients of the angular smoothing filter and the angular sharpening filter based on the characteristic of the input image.

10. The 3D display apparatus as claimed in claim 7, wherein the processor is further configured to acquire a plurality of target image views in which the plurality of rendered image views are corrected based on the epipolar image which is subject to the crosstalk inverse compensation, and arrange the plurality of image views on the display panel in the arrangement pattern based on the plurality of target image views to provide the multiview image.

11. A method of controlling a three-dimensional (3D) display apparatus including a display panel and a viewing area separator disposed on a front side of the display panel and configured to provide a plurality of optical views having different viewpoints to a viewing zone, the method comprising:
rendering a plurality of image views having different viewpoints; and
providing a multiview image by arranging the plurality of image views on the display panel in an arrangement pattern,
wherein the providing the multiview image comprises:
estimating a crosstalk occurring between the plurality of image views based on the arrangement pattern, a rendering pitch and an angle which a pixel region provided to the viewing zone is slanted by the viewing area separator,
correcting the plurality of image views by performing crosstalk inverse compensation according to the estimated crosstalk, and
providing the multiview image based on the crosstalk inverse compensation.

12. The method as claimed in claim 11, wherein a number of the plurality of image views is greater than a number of the plurality of optical views, and
each of the plurality of optical views is provided based on at least two image views of the plurality of image views having different viewpoints.

13. The method as claimed in claim 11, wherein the providing the multiview image comprises determining the estimated crosstalk based on a difference between an output pixel region of the display panel and a corresponding visible pixel region provided through the plurality of image views.

14. The method as claimed in claim 11, wherein
the providing of the multiview image comprises performing theoretical crosstalk modeling on a reference image view based on the arrangement pattern, the angle, a number of the plurality of image views, and the rendering pitch.

15. The method as claimed in claim 14, wherein the providing the multiview image comprises determining a crosstalk occurrence weight for at least one image view of the plurality of image views based on the arrangement pattern, the angle, a number of the plurality of image views, and the rendering pitch, and performing the crosstalk inverse compensation by generating a crosstalk matrix according to the crosstalk occurrence weight.

16. The method as claimed in claim 15, wherein the providing the multiview image comprises generating an epipolar image by combining a plurality of pixel lines of the plurality of rendered image views, and performing the crosstalk inverse compensation by applying a crosstalk inverse filter to the generated epipolar image, and
the applying the crosstalk inverse filter comprises inverting the crosstalk matrix.

17. The method as claimed in claim 16, wherein the providing the multiview image comprises adjusting a filtering coefficient of the crosstalk inverse filter based on a characteristic of an input image and performing the crosstalk inverse compensation by reflecting the adjusted filtering coefficient.

* * * * *